(12) United States Patent  (10) Patent No.: US 6,657,583 B2
Okamura  (45) Date of Patent: Dec. 2, 2003

(54) PULSE RADAR APPARATUS

(75) Inventor: Shigekazu Okamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/288,451

(22) Filed: Nov. 6, 2002

(65) Prior Publication Data

US 2003/0067408 A1 Apr. 10, 2003

Related U.S. Application Data

(62) Division of application No. 10/002,214, filed on Dec. 5, 2001.

(30) Foreign Application Priority Data

Jun. 7, 2001 (JP) .......................................... 2001-172517

(51) Int. Cl.⁷ .......................... G01S 13/93; G01S 13/08
(52) U.S. Cl. .......................... 342/135; 342/70; 342/145; 342/118; 342/195; 342/126
(58) Field of Search .......................... 342/70, 118, 134, 342/135, 202, 195, 126, 127, 128, 145

(56) References Cited

U.S. PATENT DOCUMENTS 5,663,731 A * 9/1997 Theodoras et al. ........... 342/70
5,798,730 A * 8/1998 Sanchez ...................... 342/195
6,239,741 B1 * 5/2001 Fontana et al. ............. 342/135

FOREIGN PATENT DOCUMENTS

JP  7-072237  3/1995
JP  10-062518  3/1998

OTHER PUBLICATIONS

Weidmann, Wolfgang, et al., *A High Resolution Radar for Short Range Automotive Applications*, 28th European Microwave Conference, Amsterdam, 1998.

* cited by examiner

*Primary Examiner*—Ian J. Lobo
(74) *Attorney, Agent, or Firm*—Sughrue Mion, PLLC

(57) ABSTRACT

The present invention provides a pulse radar apparatus which is capable of detecting properly an object and measuring a distance up to the object in a short distance even if a leakage signal is contained in a received signal. The pulse radar apparatus includes: transmission means for transmitting an electric wave; reception means for receiving the reflected electric wave into which the electric wave transmitted by the transmission means has been reflected by an object to output the received signal thereof; waveform leading part extracting means for extracting a plurality of leading parts of the received signal outputted by the reception means; sampling means for sampling the output of the waveform leading part extracting means at predetermined time intervals; and detection/distance measuring means for judging on the basis of the time interval data outputted by the time interval measuring means whether or not an object is present and when an object is present, calculating the distance up to the object.

12 Claims, 15 Drawing Sheets

PULSE RADAR APPARATUS

This is a divisional of application Ser. No. 10/002,214 filed Dec. 5, 2001; the disclosure of which is incorporated herein by reference.

BACKGROUND OF THE INVENTION

1. Field of the Invention

The present invention relates to a pulse radar apparatus. More particularly, the invention relates to a pulse radar apparatus for transmitting an electric wave to receive the reflected electric wave into which the transmitted electric wave is reflected by an object, thereby detecting the presence or absence of the object to measure a distance up to the detected object.

2. Description of the Related Art

FIG. 15 shows a schematic configuration of a conventional pulse radar apparatus, which is described, for example, in Japanese Patent Laid-open No. 7-72237. In the figure, reference numeral 1501 designates a pulse signal sending unit for outputting a pulse signal to a target; reference numeral 1502 designates a control unit for carrying out the control of the operation of the pulse radar apparatus; reference numeral 1503 designates a reflected pulse signal receiving unit for receiving a reflected pulse into which the pulse signal outputted from the sending unit 1501 is reflected by the target to be returned back; reference numeral 1504 designates a sampling unit for sampling a binary-coded signal every predetermined sampling point to obtain a sampling value of 0 or 1; reference numeral 1505 designates a plurality of addition/storage units for adding the sampling value of 0 or 1, which has been sampled by the sampling unit 1504, every predetermined number of times of sending of the sending unit 1501; and reference numeral 1506 designates a judgement unit for on the basis of the addition result provided by the addition/storage unit 1505, judging whether or not a reflected pulse from a target is present.

Next, the description will hereinbelow be given with respect to the operation of the pulse radar apparatus shown in FIG. 15. In the conventional pulse radar apparatus shown in FIG. 15, a pulse-like signal is periodically outputted by the pulse signal sending unit 1501. Then, the reflected pulses from a target (not shown) are continuously received by the receiving unit 1503 so as to be binary-coded. Then, the sampling unit 1504 samples the binary-coded signal every fixed one sampling point or a plurality of fixed sampling points after the sending timing of the sending unit 1501 to obtain the sampled value of 0 or 1 to supply the sampled value to the addition/storage units 1505 corresponding to the sampling points. Then, the addition/storage unit 1505 adds the sampled values of 0s or 1s every predetermined number of times of sending of the signals by the sending unit 1501. After completion of the addition processing for the predetermined number of times, the judgement unit 1506 compares the normalized addition value which has been obtained by dividing the addition value every addition/storage unit 1505 by the number of times of the addition with a predetermined threshold value to judge on the basis of the comparison result whether or not the reflected pulse signal from the external target is present to judge on the basis of this judgement result whether or not the external target is present.

However, in the above-mentioned conventional pulse radar apparatus, the isolation for the transmission and the reception is poor. When the so-called leakage waveform is present, it is difficult from the following reason to carry out the detection of an object which is a distance smaller than 10 m away from the apparatus, and to carry out the measurement of the distance when the object is present by using the above-mentioned conventional apparatus. That is, in the case of the conventional pulse radar apparatus, since the transmission pulse width is 66.7 ns corresponding to 10 m in terms of the distance, when an object is a distance smaller than 10 m away from the apparatus, the waveform as shown in FIG. 14 in which the leakage waveform and the waveform of the reflected electric wave overlap each other is detected. For this reason, if the threshold value is set on the basis of the reception level during non-transmission, i.e., the so-called noise level, then there arises a problem in that only the leading part of the leakage waveform can not be detected, and it is impossible to detect the leading part of the reflected electric wave which is wanted to be really detected.

In order to cope with such a problem, there have been proposed a method in which the pulse width is made very short, e.g., 350 ps as described in an article of W. Weidmann and D. Steinbuch, "High Resolution Radar for Short Range Automotive Applications", 28-th European Microwave Conference Amsterdam, 1998, and a method in which the leakage waveform is cancelled by utilizing the transmission waveform as described in Japanese Patent Laid-open No. 10-62518. However, if the transmission pulse width is shortened down to 350 ps as described in the above-mentioned article, since the leakage waveform and the waveform of the reflected electric wave overlap each other only when the distance up to the object is equal to or smaller than 5 cm, the above-mentioned problem is solved. However, there arises a problem in that since the occupation bandwidth thereof becomes very wide, such an apparatus can not be used under the scope of the current Electric Wave Law. In addition, in the case where the leakage waveform is cancelled by utilizing the transmission waveform as described in Japanese Patent Laid-open No. 10-62518, there arises a problem in that it is difficult to cope with the difference or the like in the time interval ranging from the transmission to the reception of the leakage waveform due to the difference in the object.

SUMMARY OF THE INVENTION

In the light of the foregoing, the present invention has been made in order to solve the above-mentioned problems associated with the prior art, and it is therefore an object of the present invention to provide a pulse radar apparatus which is capable of detecting properly an object, which is a short distance away from the apparatus, to measure a distance up to the object even if a leakage signal is contained in a received signal.

In view of the above object, a pulse radar apparatus of the present invention, comprises: transmission means for transmitting an electric wave; reception means for receiving the reflected electric wave into which the electric wave transmitted by said transmission means has been reflected by an object to output the received signal thereof; waveform leading part extracting means for extracting a plurality of leading parts of the received signal outputted by said reception means; time interval measuring means for on the basis of the extraction result provided by said waveform leading part extracting means, measuring a time interval ranging from the transmission to the reception by said transmission means; and detection/distance measuring means for judging on the basis of the time interval data outputted by said time interval measuring means whether or not an object is present and when an object is present, calculating the distance up to the object.

Alternatively, a pulse radar apparatus of the present invention may comprise: transmission means for transmitting an electric wave; reception means for receiving the reflected electric wave into which the electric wave transmitted by said transmission means has been reflected by an object to output the received signal thereof; waveform leading part extracting means for extracting a plurality of leading parts of the received signal outputted by said reception means; sampling means for sampling the output of said waveform leading part extracting means at predetermined time intervals; addition means for adding and storing the output result of said sampling means every sampling timing; and detection/distance measuring means for on the basis of the addition result for each of the sampling timings outputted by said addition means, judging whether or not an object is present and when an object is present, calculating a distance up to the object.

BRIEF DESCRIPTION OF THE DRAWINGS

The above and other objects as well as advantages of the present invention will become clear by the following description of the embodiments of the present invention with reference to the accompanying drawings.

DETAILED DESCRIPTION OF THE EMBODIMENTS

Embodiments of the present invention will hereinafter be described in detail with reference to the accompanying drawings.

First Embodiment

Figure 1:
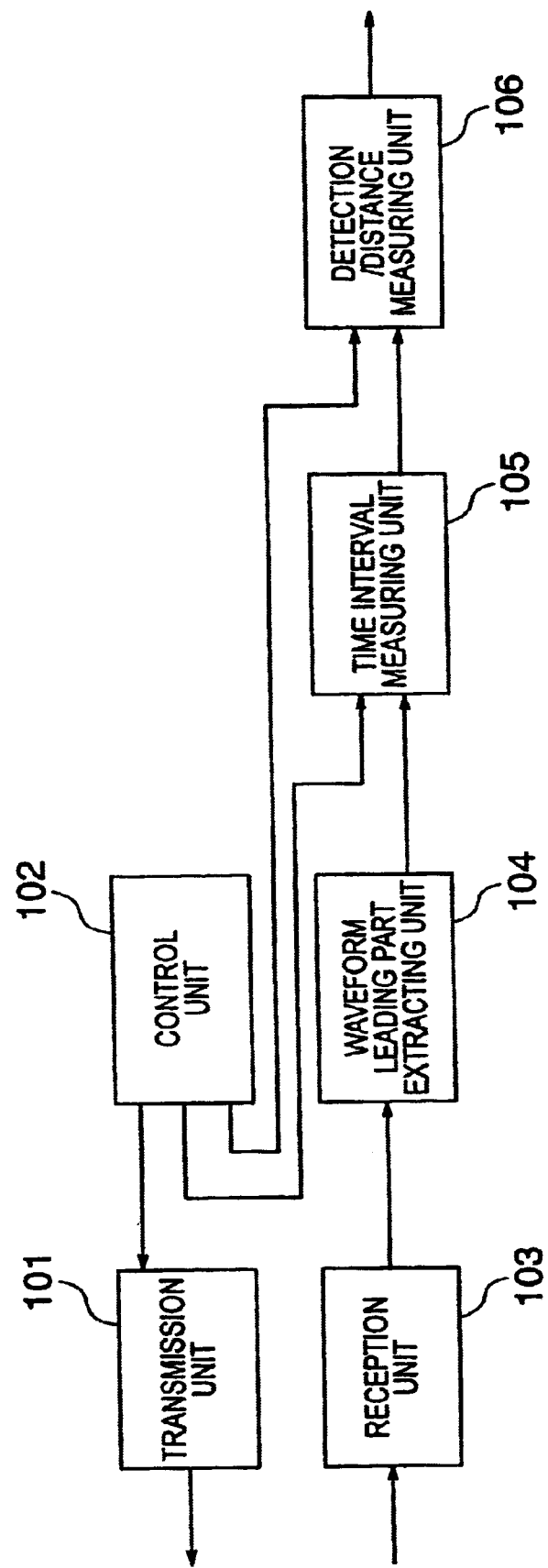
FIG. 1 is a block diagram showing a schematic configuration of a pulse radar apparatus according to a first embodiment and a second embodiment of the present invention.

FIG. 1 is a block diagram showing a schematic configuration of a pulse radar apparatus according to a first embodiment of the present invention. In FIG. 1, reference numeral 101 designates a transmission unit for transmitting an electric wave; reference numeral 103 designates a reception unit for receiving the reflected electric wave into which the electric wave transmitted from the transmission unit 101 is reflected by an object to output the received signal; reference numeral 104 designates a waveform leading part extracting unit for extracting a plurality of leading parts of the received signal outputted from the reception unit 103; reference numeral 105 designates a time interval measuring unit for on the basis of the extraction result from the waveform leading part extracting unit 104, measuring a time interval ranging from the transmission to the reception; and reference numeral 106 designates a detection/distance measuring unit for on the basis of the time interval data outputted from the time interval measuring unit 105, judging whether or not an object is present to calculate the distance up to the object when it is judged that the object is present.

Figure 2:
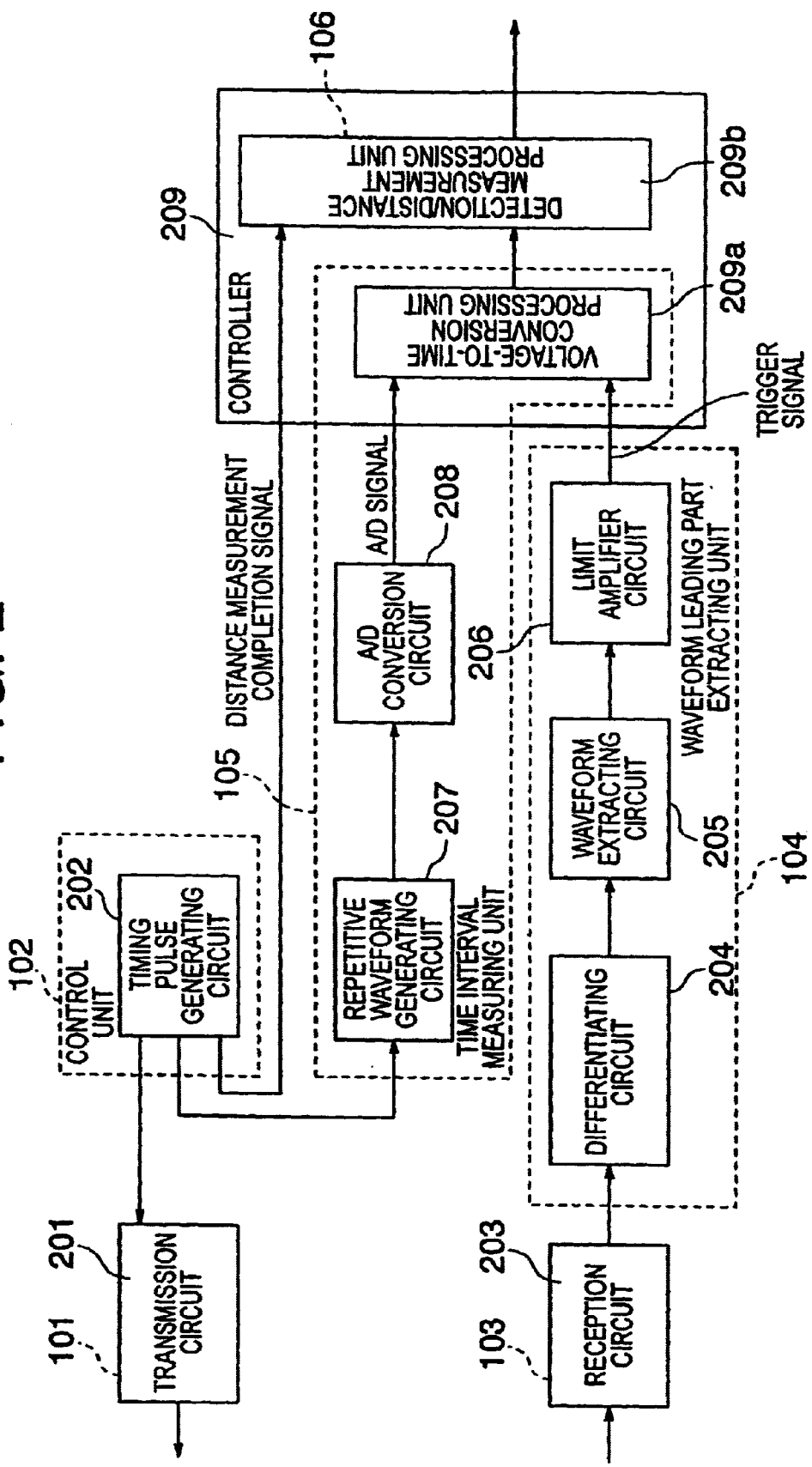
FIG. 2 is a block diagram showing a concrete circuit configuration of the pulse radar apparatus according to the first embodiment of the present invention.

FIG. 2 is a block diagram showing a concrete circuit configuration of the pulse radar apparatus according to the present embodiment. In FIG. 2, reference numeral 202 designates a timing pulse generating circuit for generating a transmission ON/OFF signal which is used to control ON/OFF of the transmission of a high frequency signal sent by a transmission circuit 201 which will be described later and for generating various control pulses which are used to control a repetitive waveform generating circuit 207 provided in the time interval measuring unit 105, and a controller 209. Reference numeral 201 designates a transmission circuit for generating a high frequency signal of 24.125 GHz to subject the high frequency signal to the ON/OFF operation on the basis of the transmission ON/OFF signal generated by the timing pulse generating circuit 202 to radiate the high frequency signal toward the outside of the apparatus. Reference numeral 203 designates a reception circuit for receiving the reflected electric wave into which the high frequency signal transmitted from the transmission circuit 201 is reflected by an object to mix this reflected electric wave with the high frequency signal of 24.125 GHz generated by the transmission circuit 201 and for carrying out the AM detection. Also, reference numeral 204 designates a differentiating circuit for differentiating the detection waveform outputted by the reception circuit 203, reference numeral 205 designates a waveform extracting circuit for extracting only a positive part of the waveform of the output signal voltage of the differentiating circuit 204, reference numeral 206 designates a limit amplifier circuit for amplifying the output signal of the waveform extracting circuit 205, reference numeral 207 designates a repetitive waveform generating circuit for on the basis of the output of the timing pulse generating circuit 202, generating a saw-toothlike repetitive waveform, and reference numeral 208 designates an A/D conversion circuit for converting the output signal of the repetitive waveform generating circuit 207 into the digital data. Reference symbol 209a designates a voltage-to-time conversion processing unit for on the basis of a trigger signal outputted by the limit amplifier circuit 206, reading out an A/D signal outputted by the A/D conversion circuit 208 to convert the result thus read out into the data relating to a time, and reference symbol 209b designates a detection/distance measurement processing unit for on the basis of a distance measurement completion signal outputted by the timing pulse generating circuit 202, detecting an object and measuring a distance up to the detected object from the result provided by the voltage-to-time conversion processing unit 209a. The controller 209 is constituted by the voltage-to-time conversion processing unit 209a and the detection/distance measurement processing unit 209b.

Figure 3:
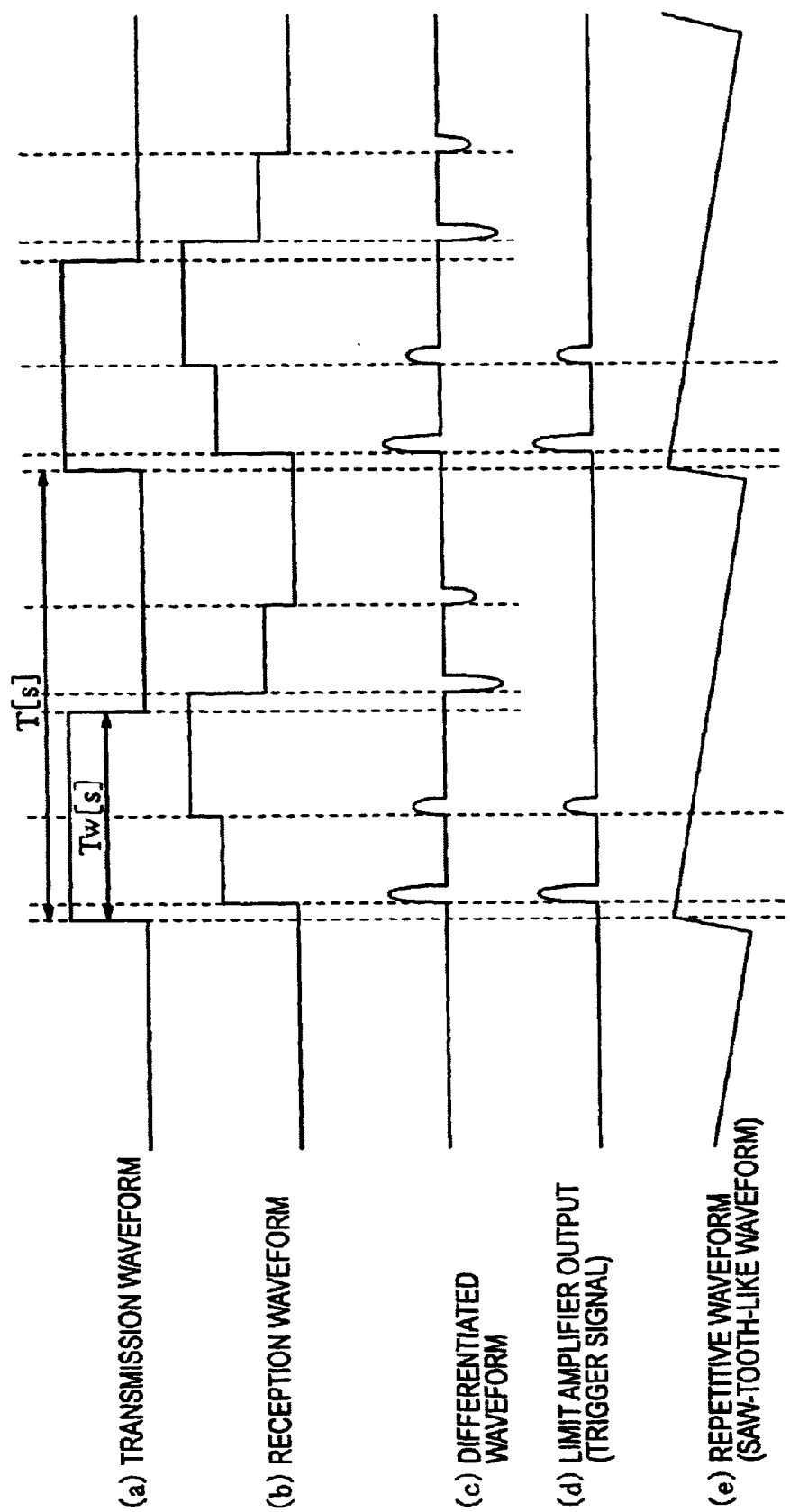
FIGS. 3(a) to 3(e) show a timing chart useful in explaining the operation of the pulse radar apparatus according to the first embodiment of the present invention.

Next, the description will be given hereinafter with respect to the operation of the pulse radar apparatus of the present invention shown in FIG. 2 with reference to a timing chart of FIG. 3. The transmission circuit 201 generates the high frequency signal of 24.125 GHz, and also on the basis of the ON/OFF signal having the repetitive period T [s] and the pulse width Tw [s] which is generated by the timing pulse generating circuit 202, subjects the high frequency signal to the ON/OFF operation to radiate the high frequency signal in the form of the electric wave to the outside of the pulse radar apparatus (refer to FIG. 3(a)). The electric wave thus radiated strikes an object to be reflected thereby to be inputted to the reception circuit 203. At this time, since the leakage component is also directly inputted from the transmission circuit 201 to the reception circuit 203 at the same time, with respect to the reception signal 203, as shown in FIG. 3(b), the detected waveform overlaps the leakage waveform. In this pulse radar apparatus, the resultant waveform is processed in the differentiating circuit 204 in the next stage to obtain the pulse waveform, which has a peak at the leading/trailing part of the waveform as shown in FIG. 3(c). Then, after the waveform on the negative side has been deleted in the waveform extracting circuit 205, the signal having the resultant waveform is inputted to the limit amplifier circuit 206 to be converted into the target signal the amplitude of which is sufficiently large as the trigger signal (refer to FIG. 3(d)). On the other hand, in the repetitive waveform generating circuit 207, the signal having the saw-tooth-like waveform is generated synchronously with the transmission signal from the control means 202 (refer to a part (c) of FIG. 3). The controller 209, at a time point when receiving the trigger signal outputted from the limit amplifier circuit 206, takes in the voltage value having the saw-tooth-like waveform, which has been generated by the repetitive waveform generating circuit 207, through the A/D conversion circuit 208. Since this voltage value is linearly decreased from the start of the transmission, if this relationship is utilized, then the voltage value can be changed into the time from the start of the transmission. Then, the voltage-to-time conversion processing unit 209a of the controller 209 executes the processing to calculate the time from the start of the transmission. In the detection/distance measurement processing unit 209b in the next stage, the judgement whether or not an object is present and the measurement of the distance are carried out.

Figure 4:
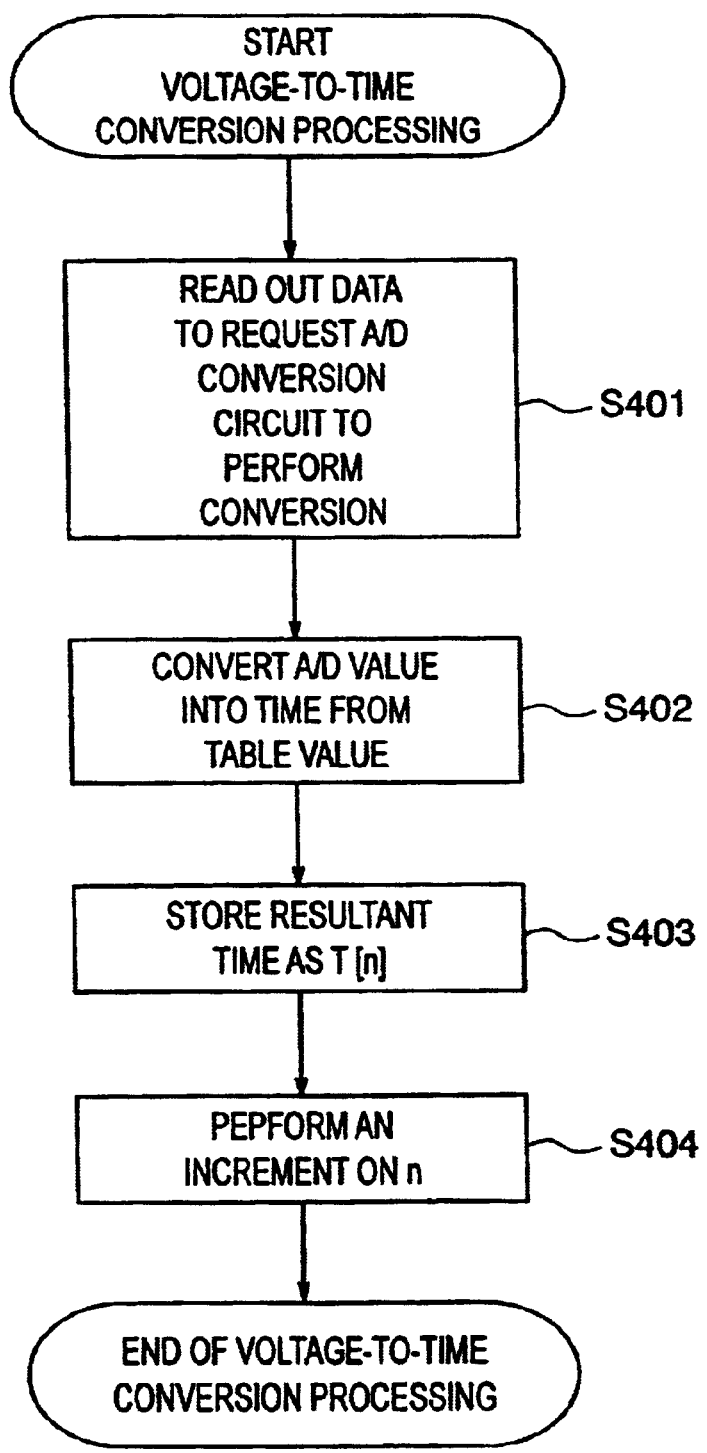
FIG. 4 is a flow chart useful in explaining the voltage-to-time conversion processing of the pulse radar apparatus according to the first embodiment of the present invention.

Next, the description will hereinbelow be given with respect to the voltage-to-time conversion processing and the detection/distance measurement processing in the controller of this apparatus with reference to flow charts of FIG. 4 and FIG. 5. First of all, the description will hereinbelow be given with respect to the voltage-to-time conversion processing with reference to FIG. 4. The voltage-to-time conversion processing is an interrupt processing based on the output (trigger signal) of the limit amplifier circuit 206. Thus, at the time when the trigger signal has been inputted, first of all, in Step S401, the data is read out to request the A/D conversion circuit 208 to carry out the conversion. Next, in Step S402, by making reference to the resultant conversion data and the table value for the conversion which is previously prepared, a time when inputting the trigger signal is obtained. Furthermore, the data relating to the time thus obtained is stored as T [n] in Step S403 to update the number n of detection points in Step S404.

Figure 5:
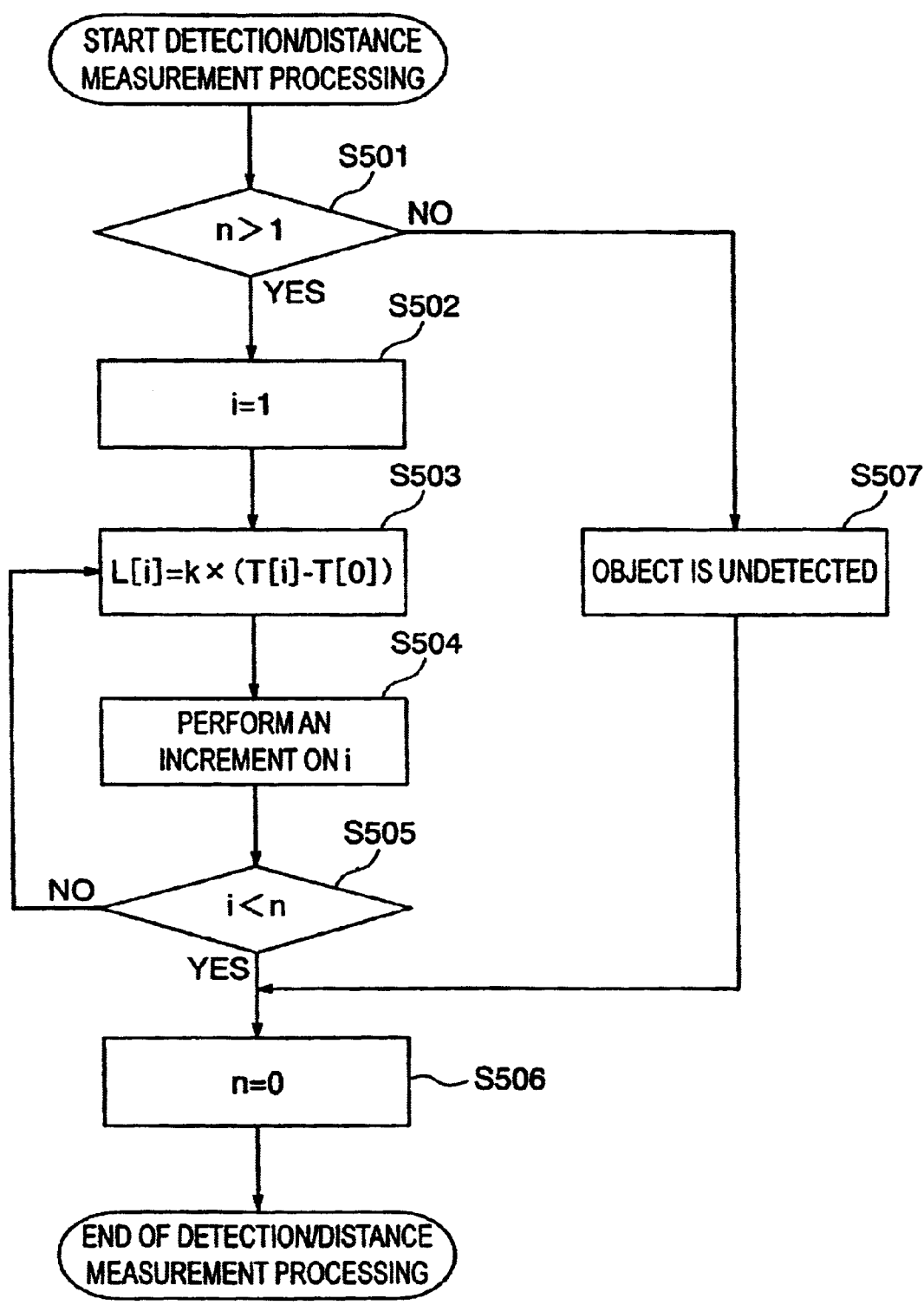
FIG. 5 is a flow chart useful in explaining the detection/distance measurement processing of the pulse radar apparatus according to the first embodiment of the present invention.

On the other hand, the detection/distance measurement processing, as shown in a flow chart of FIG. 5, is the interrupt processing which is activated on the basis of the distance measurement completion signal outputted by a timing pulse generating circuit 202. Thus, at the time when the distance measurement completion signal has been inputted, first of all, the data relating to the number n of trigger signals is read out. In Step S501, it is judged whether or not the number of trigger signals is larger than 1. If it is judged in Step S501 that the number of trigger signals is larger than 1, then in Step S502, the value of i is initialized to 1, and then in Step S503, a time difference between the reference time T[0] and the time T[i] when inputting the trigger signal is calculated to be changed into the distance. Next, in Step S504, the value of i is updated. In Step S505, it is judged whether or not the processing in Step S503 has been completed with respect to all of i. If it is judged in Step S505 that the processing in Step S503 has already been completed with respect to all of i, then in Step S506, the value of n is initialized to zero to complete the detection/distance measurement processing. On the other hand, if it is judged in Step S501 that the number n of trigger signals is equal to or smaller than 1, then the object is decided to be undetected to complete the processing.

As described above, according to the pulse radar apparatus of the present embodiment, since the leading part of the received waveform is extracted, and the detection/distance measurement is carried out on the basis of the extraction result, even if an object is a short distance away from the apparatus where the leakage waveform and the reflected waveform overlap each other, it is possible to carry out properly the detection and the distance measurement of an object.

Second Embodiment

Figure 6:
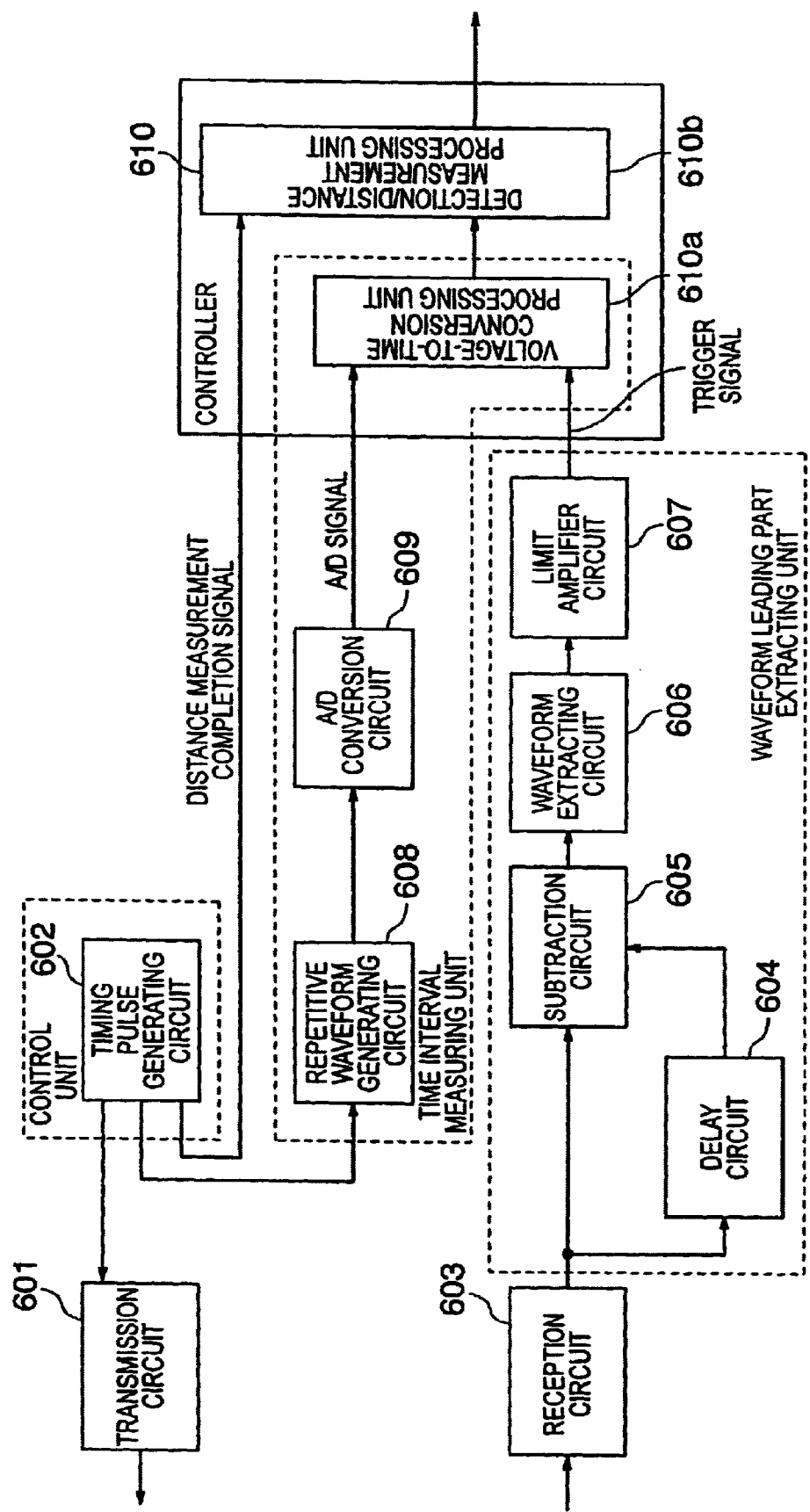
FIG. 6 is a block diagram showing a concrete circuit configuration of the pulse radar apparatus according to the second embodiment of the present invention.

The description will hereinbelow be given with respect to a pulse radar apparatus according to a second embodiment of the present invention. The pulse radar apparatus of the present embodiment basically has the same configuration as that shown in FIG. 1. FIG. 6 is a block diagram showing a concrete circuit configuration of the present embodiment. In FIG. 6, reference numeral 602 designates a timing pulse generating circuit for generating a transmission ON/OFF signal which is used to control ON/OFF of the transmission of a high frequency signal transmitted by a transmission circuit 601 which will be described later and for generating various control pulses which are used to control a repetitive waveform generating circuit 608 provided in time interval measuring means 105, and a controller 610. Reference numeral 601 designates the transmission circuit for generating a high frequency signal of 24.125 GHz and for on the basis of the transmission ON/OFF signal generated by the timing pulse generating circuit 602, subjecting the high frequency signal to the ON/OFF operation to radiate the high frequency signal toward the outside of the apparatus. Reference numeral 603 designates a reception circuit for receiving the reflected electric wave into which the high frequency signal transmitted from the transmission circuit 601 is reflected by an object to mix the reflected electric wave with the high frequency signal of 24.125 GHz generated by the transmission circuit 601 and for carrying out the AM detection. Reference numeral 604 designates a delay circuit for delaying the detection waveform outputted by the reception circuit 603 by a predetermined time, reference numeral 605 designates a subtraction circuit for obtaining the difference between the detection waveform of the reception circuit 603 and the detection waveform which is delayed through the delay circuit 604 by the predetermined time, reference numeral 606 designates a waveform extracting circuit for extracting only a positive part of the waveform of the output signal voltage of the subtraction circuit 605, reference numeral 607 designates a limit amplifier circuit for amplifying the output signal of the waveform extracting circuit 606, reference numeral 608 designates a repetitive waveform generating circuit for generating a saw-tooth-like repetitive waveform on the basis of the output of the timing pulse generating circuit 602, and reference numeral 609 designates an A/D conversion circuit for converting the output signal of the repetitive waveform generating circuit 608 into the digital data. In addition, reference numeral 610a designates a voltage-to-time conversion processing unit for on the basis of a trigger signal outputted from the limit amplifier circuit 607, reading out the A/D signal outputted by the A/D conversion circuit 609 to convert the read result, into the data relating to a time, and reference numeral 610b designates a detection/distance measurement processing unit for on the basis of a distance measurement completion signal outputted by the timing pulse generating circuit 602, detecting an object and measuring a distance up to the object thus detected on the basis of the result of the voltage-to-time conversion processing unit 610a. Note that, the controller 610 is constituted by the voltage-to-time conversion processing unit 610a and the detection/distance measurement processing unit 610b. A point of difference from the first embodiment is that instead of the differentiating circuit 204 in the first embodiment, in this embodiment both the delay circuit 604 and the subtraction circuit 605 are provided therein.

Figure 7:
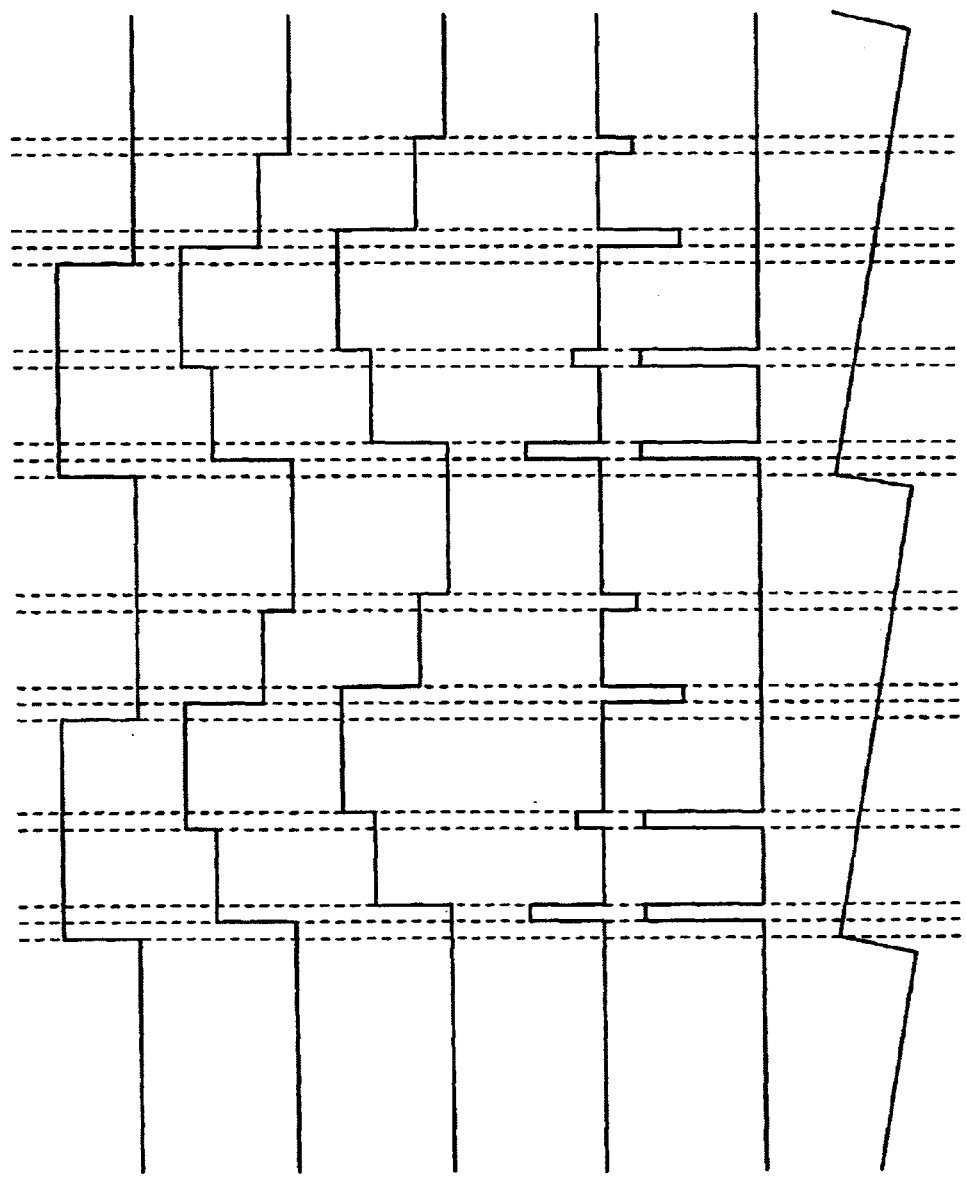
FIGS. 7(a) to 7(f) show a timing chart useful in explaining the operation of the pulse radar apparatus according to the second embodiment of the present invention.

Next, the description will hereinafter be given with respect to the operation of this apparatus with reference to a timing chart of FIG. 7. The transmission circuit 601 generates the high frequency signal of 24.125 GHz, and on the basis of the ON/OFF signal having the repetitive period T[s] and the pulse width Tw[s] which is generated by the timing pulse generating circuit 602, subjects the high frequency signal to the ON/OFF operation to radiate the high frequency signal in the form of the electric wave toward the outside of the pulse radar apparatus (refer to FIG. 7). The electric wave thus radiated strikes an object to be reflected thereby to be inputted to the reception circuit 603. At this time, since the leakage component is also directly inputted from the transmission circuit 601 to the reception circuit 603 at the same time, with respect to the reception signal, as shown in FIG. 7(b), the detected waveform overlaps the leakage waveform. In this apparatus, this waveform thus obtained is divided into two waveforms. That is, one is directly inputted to the subtraction circuit 605, and the other undergoes a predetermined time delay through the delay circuit 604 is obtained (refer to FIG. 7(c)) and then is inputted to the subtraction circuit 605. In the subtraction circuit 605, the difference in the output between the reception circuit 603 and the delay circuit 604 (refer to FIG. 7(d)). In addition, after the waveform on the negative side has been deleted in the waveform extracting circuit 606 on the basis of the result of the subtraction circuit 605, the signal having the resultant waveform is inputted to the limit amplifier circuit 607 to be converted into the signal the amplitude of which is sufficient as the trigger signal (refer to FIG. 7(e)). On the other hand, in the repetitive waveform generating circuit 608, the saw-tooth-like waveform is generated synchronously with the transmission signal from the control means 602 (refer to FIG. 7(f)). The controller 610, at a time point when receiving the trigger signal outputted by the limit amplifier circuit 607, takes in the voltage value having the saw-tooth-like waveform generated by the repetitive waveform generating circuit 608 through the A/D conversion circuit 609. Since this voltage value is linearly decreased from the start of the transmission, if this relationship is utilized, then the voltage value can be changed into the data relating to a time from the start of the transmission. Then, the processing therefor is executed in the voltage-to-time conversion processing unit 610a of the controller 610 to calculate a time from the start of the transmission. In the detection/distance measurement processing unit 601b in the next stage, the judgement whether or not an object is present and the distance measurement are both carried out.

Note that, since the processing in the controller 610 is completely the same as that in the first embodiment, the description thereof is omitted here for the sake of simplicity.

As described above, according to the pulse radar apparatus of the present embodiment, similarly to the above-mentioned embodiment, since the leading part of the received waveform is extracted, and the detection and the distance measurement are carried out on the basis of the extraction result, even if an object is a short distance away from the apparatus where the leakage waveform and the reflected waveform overlap each other, the detection and the distance measurement can be carried out. In addition, in the present embodiment, since the difference between the received signal and the delay signal which has been obtained by delaying the original signal by a predetermined time through the delay circuit 604 is obtained, thereby extracting the leading part, the waveform having the pulse width for the delay time as the leading part of the received signal can be extracted, and hence the output of the waveform leading part extracting unit 104 has the same pulse width at all times. Therefore, even the leading part of the small waveform can be detected in a stable manner.

Third Embodiment

Figure 8:
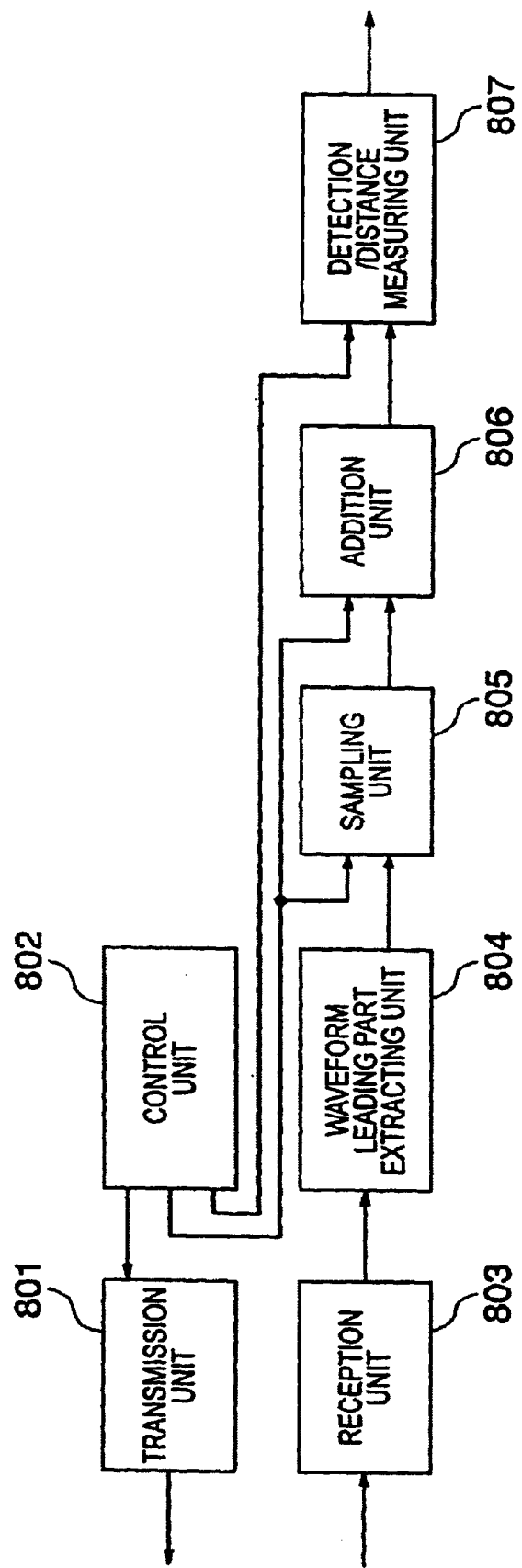
FIG. 8 is a block diagram showing a schematic configuration of a pulse radar apparatus according to a third and a fourth embodiments of the present invention.

FIG. 8 is a block diagram showing a schematic configuration of a pulse radar apparatus according to a third embodiment of the present invention. In FIG. 8, reference numeral 801 designates a transmission unit for transmitting an electric wave; reference numeral 803 designates a reception unit for receiving the reflected electric wave into which the electric wave transmitted by the transmission unit 801 is reflected by an object to output the received signal; reference numeral 804 designates a waveform leading part extracting unit for extracting a plurality of leading parts of the received signal outputted by the reception unit 803; reference numeral 805 designates a sampling unit for sampling the output of the waveform leading part extracting unit at predetermined time intervals; reference numeral 806 designates an addition unit for adding and storing the output result of the sampling unit 805 every sampling timing; and reference numeral 807 designates a detection/distance measuring unit for on the basis of the addition result for each of the sampling timings outputted by the addition unit 806, judging whether or not an object is present and when it is judged that an object is present, calculating a distance up to the object.

Figure 9:
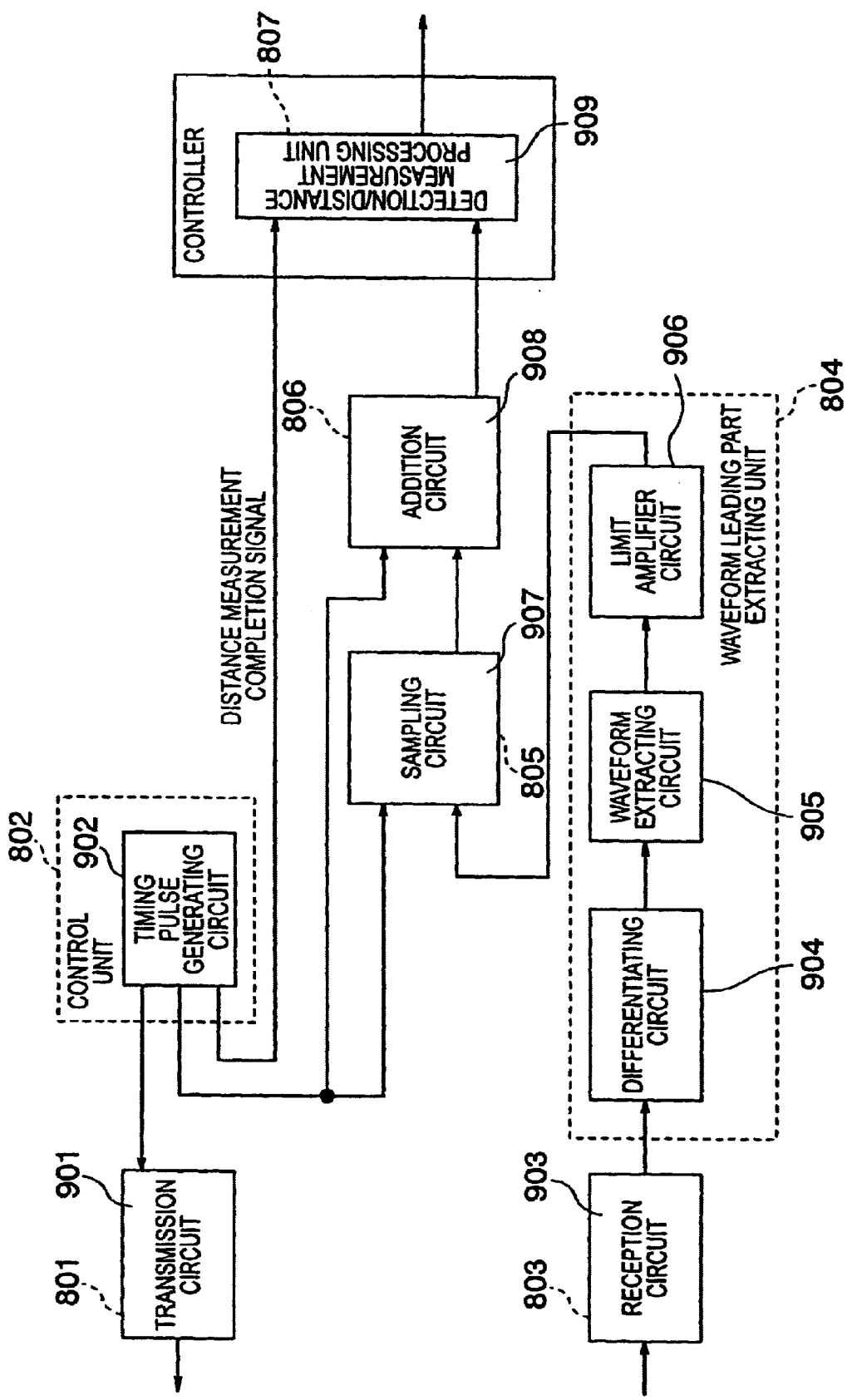
FIG. 9 is a block diagram showing a concrete circuit configuration of the pulse radar apparatus according to the third embodiment of the present invention.

FIG. 9 is a block diagram showing a concrete circuit configuration of the pulse radar apparatus according to the present embodiment. In FIG. 9, reference numeral 902 designates a timing pulse generating circuit for generating various control pulses which are used to control the transmission; and reference numeral 901 designates a transmission circuit for generating a high frequency signal of 24.125 GHz and for subjecting the high frequency signal to the ON/OFF operation on the basis of a transmission ON/OFF signal provided by the timing pulse generating circuit 902 to radiate the high frequency signal toward the outside of the apparatus. Reference numeral 903 designates a reception circuit for receiving the reflected electric wave into which the electric wave transmitted from the transmission circuit 901 is reflected by an object to mix the reflected electric wave with the high frequency signal of 24.125 GHz generated by the transmission circuit 901 and for carrying out the AM detection. Also, reference numeral 904 designates a differentiating circuit for differentiating the detection waveform of the signal outputted by the reception circuit 903, reference numeral 905 designates a waveform extracting circuit for extracting only a positive part of the waveform of the output signal voltage of the differentiating circuit 904, and reference numeral 906 designates a limit amplifier circuit for amplifying the output signal of the waveform extracting circuit 905. Reference numeral 907 designates a sampling circuit for in accordance with the timing pulse generated by the timing pulse generating circuit 902, judging whether or not the output of the limit amplifier circuit 906 exceeds a threshold value and outputting 1 when it is judged that the output of the limit amplifier circuit 906 exceeds a threshold value, while outputting 0 when it is judged that the output of the limit amplifier circuit 906 does not exceed a threshold value, and reference numeral 908 designates an addition circuit for adding the signals 0s/1s outputted by the sampling circuit in accordance with the timing pulse generated by the timing pulse generating circuit 902. Reference numeral 909 designates a controller having a detection/distance measurement processing unit for executing the detection/distance measurement processing on the basis of a distance measurement completion signal generated by the timing pulse generating circuit 902.

Figure 10:
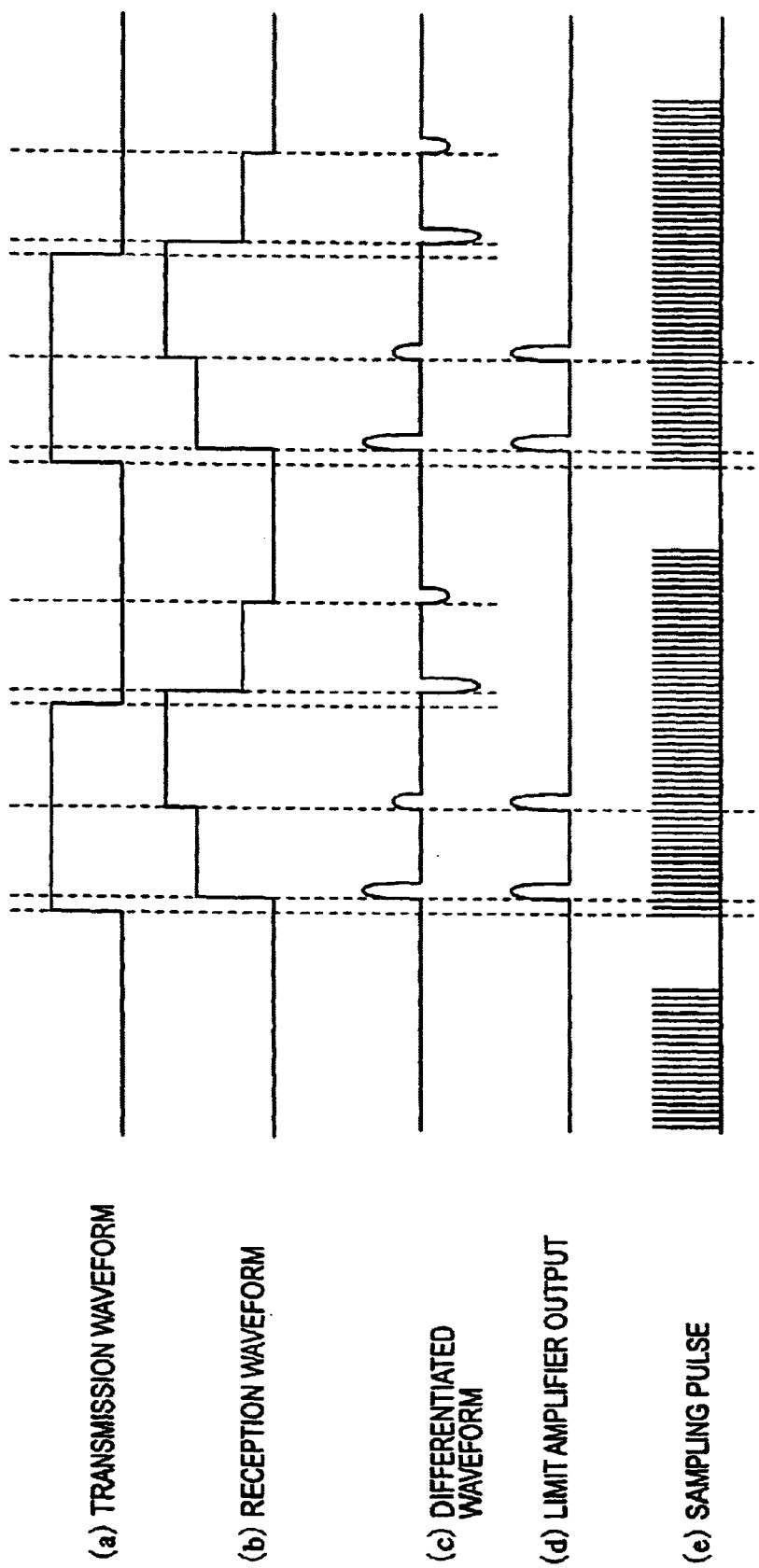
FIGS. 10(a) to 10(e) show a timing chart useful in explaining the operation of the pulse radar apparatus according to the third embodiment of the present invention.

Next, the description will hereinafter be given with respect to the operation of this apparatus with reference to a flow chart of FIG. 10. The transmission circuit 901 generates the high frequency signal of 24.125 GHz, and also on the basis of the ON/OFF signal having the repetitive period T [s] and the pulse width Tw [s] which is generated by the timing pulse generating circuit 902, subjects the high frequency signal to the ON/OFF operation to radiate the high frequency signal in the form of the electric wave toward the outside of the pulse radar apparatus (refer to FIG. 10(a)). The electric wave thus radiated strikes an object to be reflected thereby to be inputted to the reception circuit 903. At this time, since the leakage component is also directly inputted from the transmission circuit 901 to the reception circuit 903, with respect to the received signal, as shown in FIG. 10(b), the detected waveform overlaps the leakage waveform. In this apparatus, this waveform is processed in the differentiating circuit 904 in the next stage to be made the pulse waveform, which has a peak at the leading/trailing part as in FIG. 10(c). Then, after the waveform on the negative side has been deleted in the waveform extracting circuit 905, the signal having the resultant waveform is inputted to the limit amplifier circuit 906 to be converted into the signal the amplitude of which is sufficient as the trigger signal (refer to FIG. 10(d)). The sampling circuit 907, on the basis of the sampling pulse generated by the timing pulse generating circuit 902, judges whether or not the output of the limit amplifier circuit 906 exceeds a threshold value. Also, in the addition circuit 908, the output of the sampling circuit 907, on the basis of the sampling pulse, is added and stored every sampling timing. Finally, the controller 909 takes in the output of the addition circuit 908 on the basis of a distance measurement completion signal outputted by the timing pulse generating circuit 902 to execute the detection/distance measurement processing.

Figure 13:
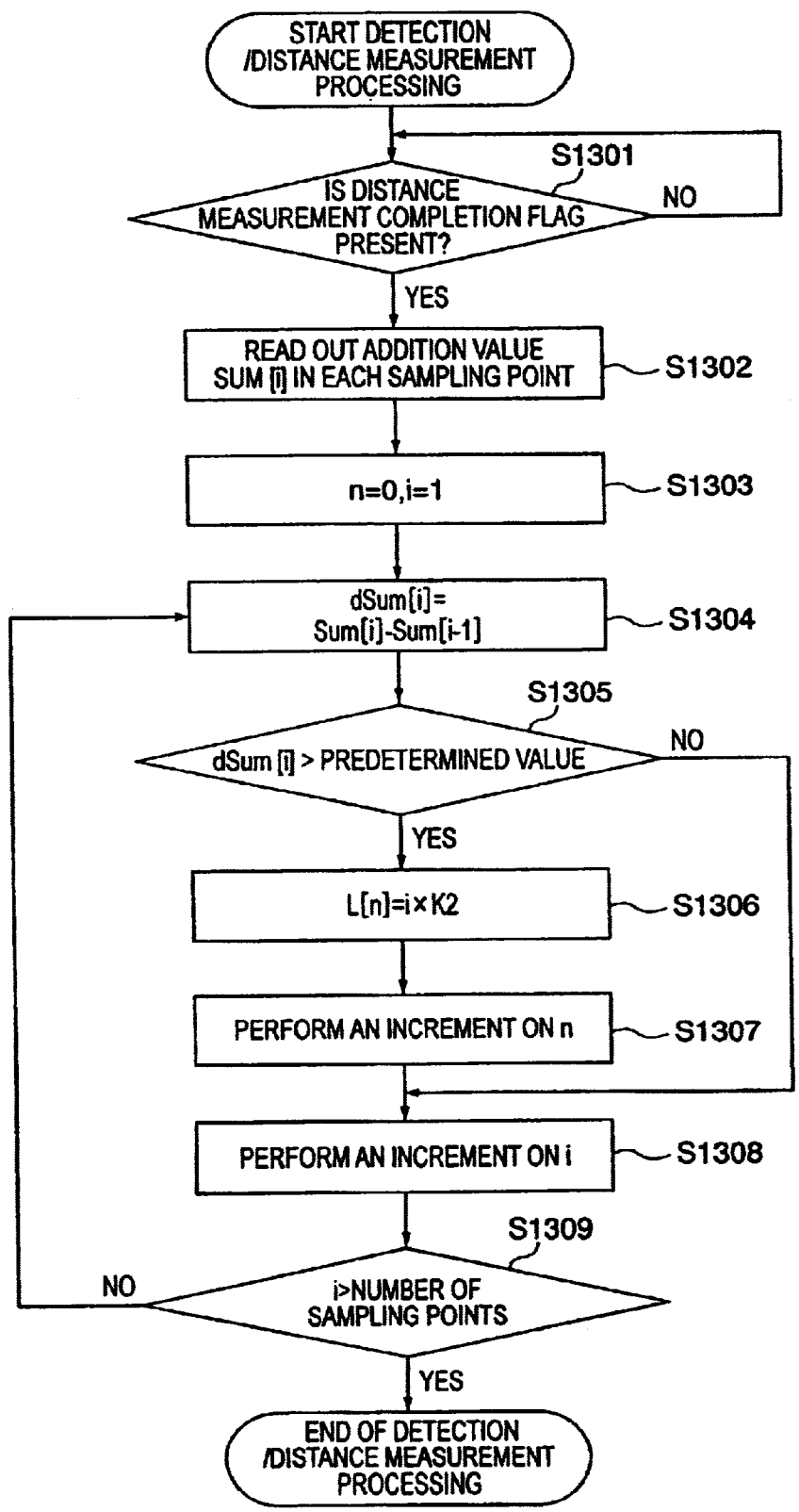
FIG. 13 is a flow chart useful in explaining the detection/distance measurement processing of the pulse radar apparatus according to the third embodiment of the present invention.
Figure 14:
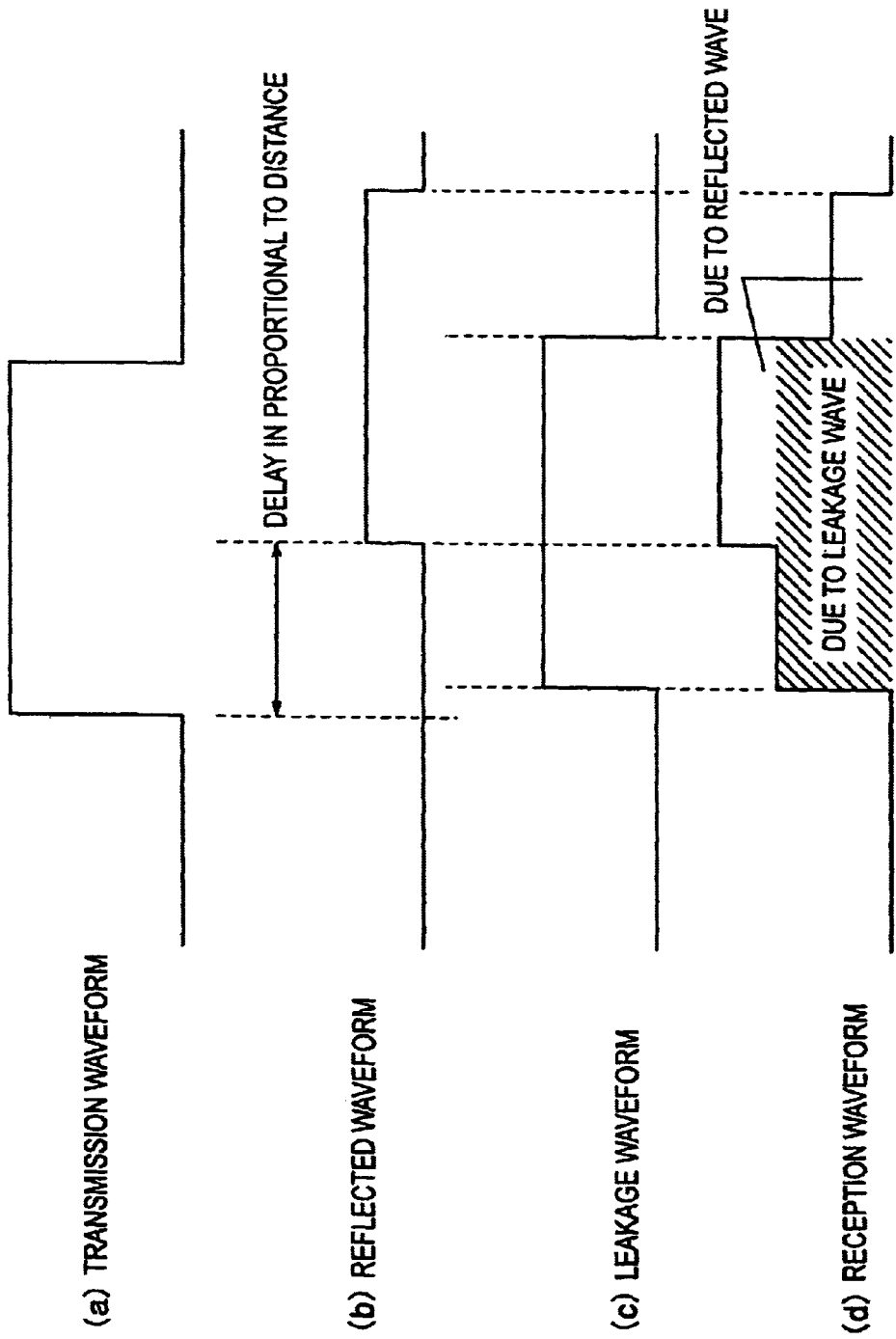
FIGS. 14(a) to 14(d) show a timing chart useful in explaining the leakage electric wave and the reflected electric wave.
Figure 15:
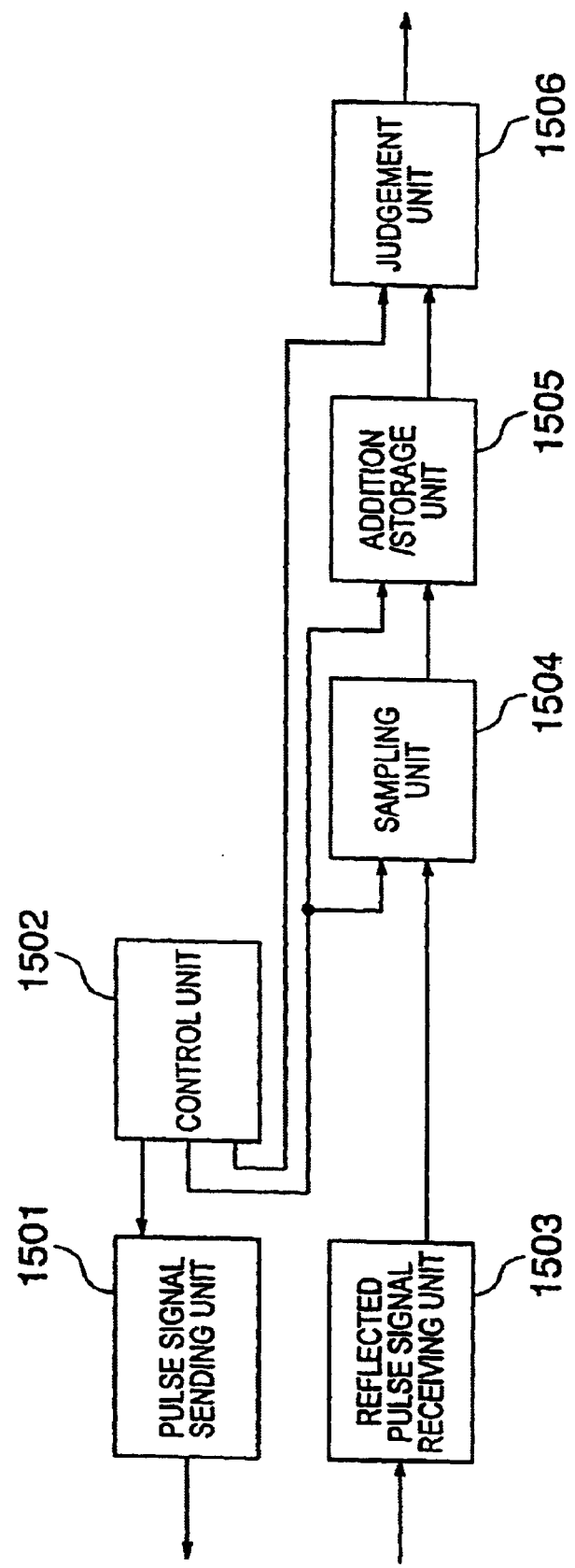
FIG. 15 is a block diagram showing a schematic configuration of a conventional pulse radar apparatus.

In the detection/distance measurement processing in the controller 909, as shown in FIG. 13, it is confirmed in Step S1301 that the distance measurement completion signal provided by the timing pulse generating circuit 902 has been inputted, and then first of all, in Step S1302, the added value for each of the sampling timings is read out from the addition circuit 908. Then, in Step S1303, i representing the number of processed data and n representing the number of detected data are respectively initialized. Next, in Step S1304, the change for each of the sampling timings is calculated, and then it is judged in Step S1305 whether or not the resultant value exceeds a predetermined value. If it is judged in Step S1305 that the resultant value exceeds a predetermined value, then in Step S1306, the resultant value is changed into the distance, and then in Step S1307 and in Step S1308, the number n of detected data and the number i of processed data are respectively incremented. On the other hand, if it is judged in Step S1305 that the resultant value does not exceed a predetermined value, then the processing directly proceeds to Step S1308. In the next Step S1309, it is judged whether or not the number of processed data exceeds the number of sampling. If it is judged in Step S1309 that the number of processed data exceeds the number of sampling, then the processing is completed.

As described above, according to the pulse radar apparatus of the present embodiment, the output of the waveform leading part extracting unit 804 is sampled at predetermined time intervals, the output result is added and stored in the addition unit 806 every sampling timing only for the predetermined number of times, and the detection of an object and the distance measurement are carried out using the addition result. Therefore, the reception gain is increased due to the integration effect of a kind, and also the detection and the distance measurement can be carried out in a stable manner due to the averaging effect.

Fourth Embodiment

Figure 11:
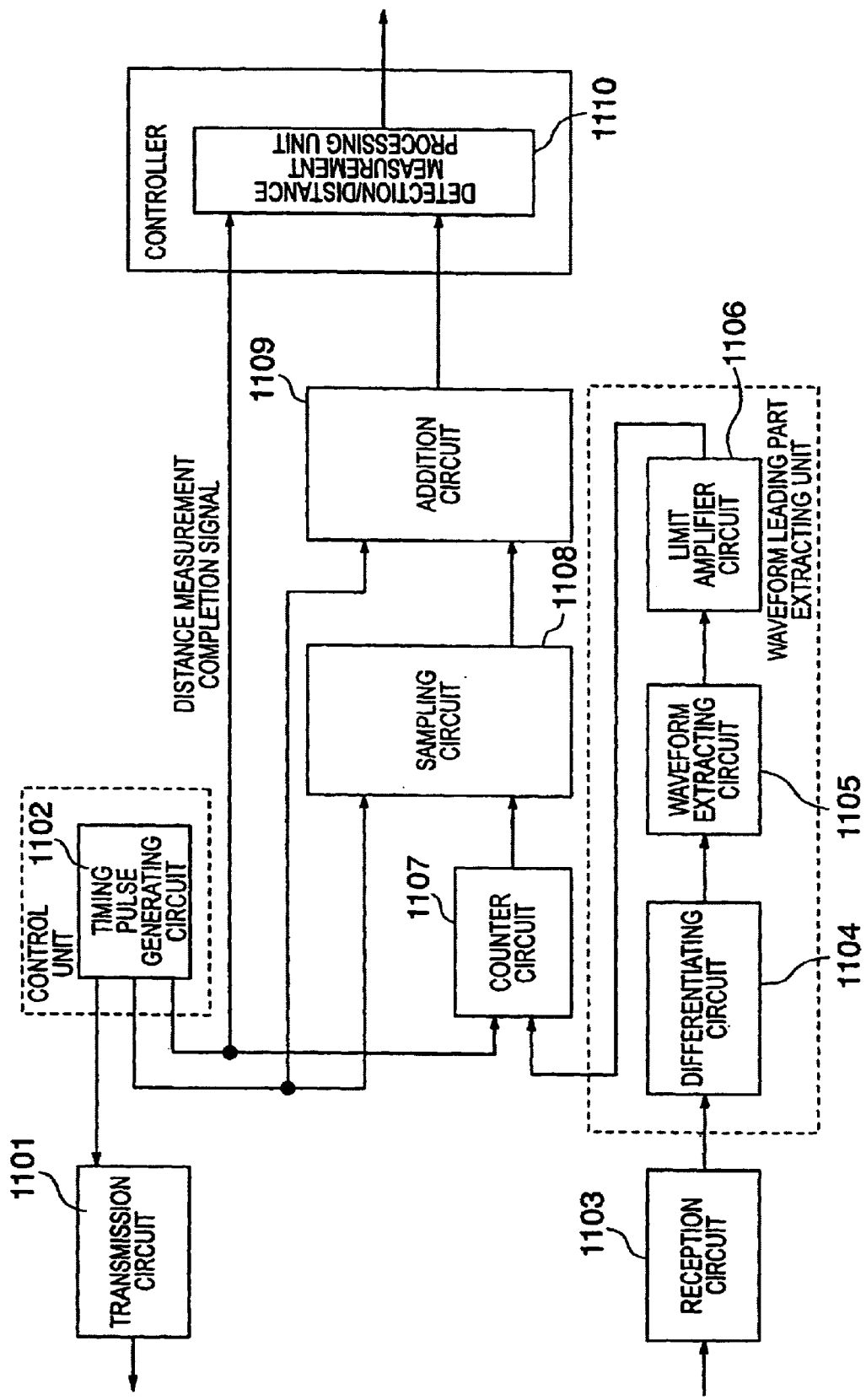
FIG. 11 is a block diagram showing a concrete circuit configuration of the pulse radar apparatus according to the fourth embodiment of the present invention.

A pulse radar apparatus according to a fourth embodiment of the present invention will hereinafter be described. The pulse radar apparatus of the present embodiment has basically the same configuration as that shown in FIG. 8. Note that, FIG. 11 is a block diagram showing a concrete circuit configuration of the present embodiment. In FIG. 11, reference numeral 1102 designates a timing pulse generating circuit for generating various control pulses which are used to control the transmission, and reference numeral 1101 designates a transmission circuit for generating a high frequency signal of 24.125 GHz and for subjecting the high frequency signal to the ON/OFF operation on the basis of a transmission ON/OFF signal provided by the timing pulse generating circuit 1102 to radiate the high frequency signal toward the outside of the apparatus. Reference numeral 1103 designates a reception circuit for receiving the reflected electric wave into which the electric wave transmitted by the transmission circuit 1101 is reflected by an object to mix the reflected electric wave with the high frequency signal of 24.125 GHz generated by the transmission circuit 1101 and for carrying out the AM detection. Reference numeral 1104 designates a differentiating circuit for differentiating the detected waveform outputted from the reception circuit 1103; reference numeral 1105 designates a waveform extracting circuit for extracting only a positive part of the waveform of the output signal voltage of the differentiating circuit 1104; reference numeral 1106 designates a limit amplifier circuit for amplifying the output signal of the waveform extracting circuit 1105; reference numeral 1107 designates a counter circuit which is adapted to be reset by the distance measurement completion signal generated by the timing pulse generating circuit 1102 and also is adapted to be counted-up by the output of the limit amplifier circuit 1106; reference numeral 1108 designates a sampling circuit for sampling the value of the counter circuit 1107 in accordance with the timing pulse generated by the timing pulse generating circuit 1102; reference numeral 1109 designates an addition circuit for adding the values of the signals outputted from the sampling circuit 1108 in accordance with the timing pulses generated by the timing pulse generating circuit 1102; and reference numeral 1110 designates a controller having a detection/distance measurement processing unit for on the basis of the distance measurement completion signal generated by the timing pulse generating circuit 1102, carrying out the detection/distance measurement processing.

Figure 12:
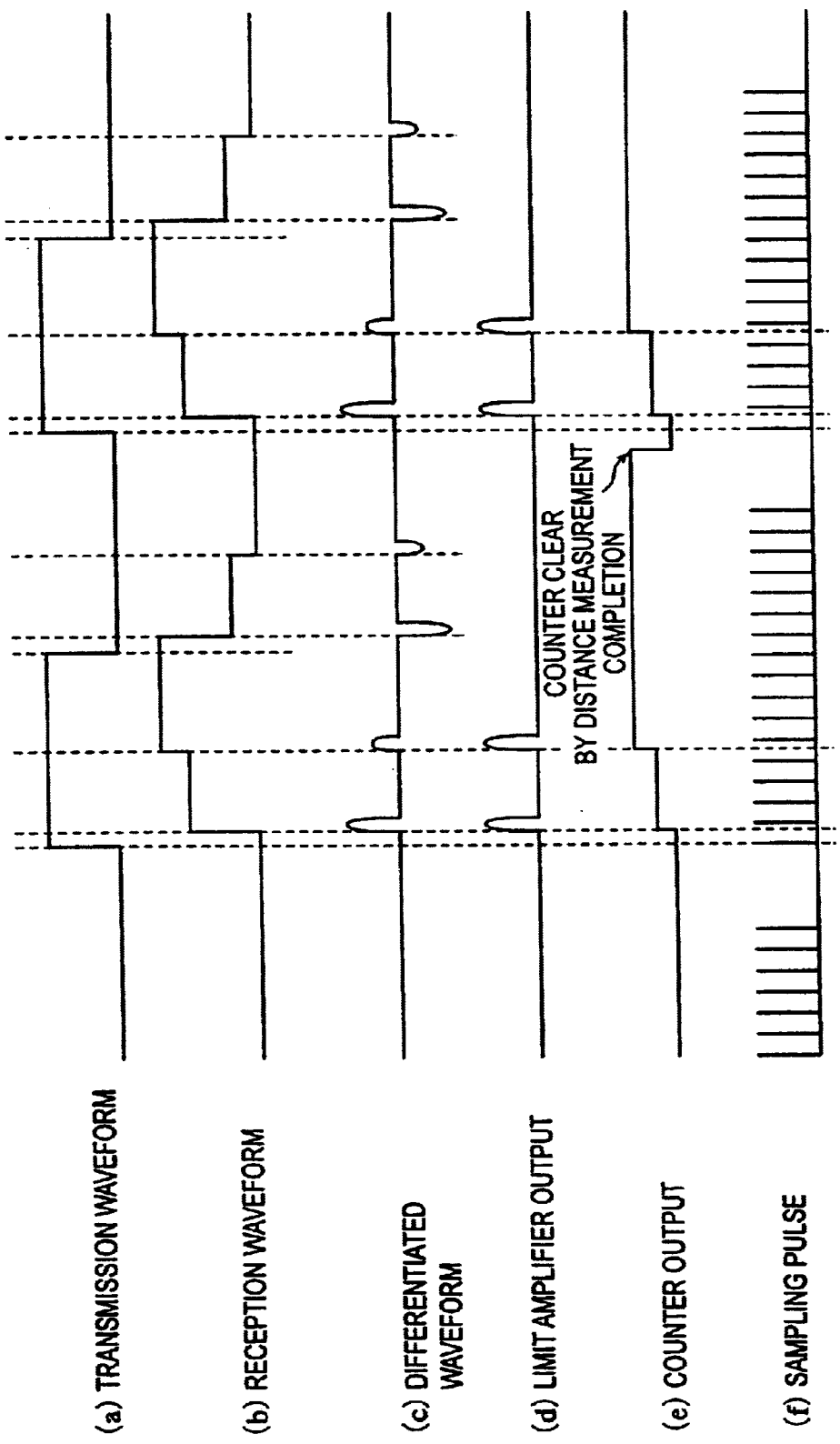
FIGS. 12(a) to 12(f) show a timing chart useful in explaining the operation of the pulse radar apparatus according to the fourth embodiment of the present invention.

Next, the description will hereinafter be given with respect to the operation of this pulse radar apparatus with reference to a timing chart of FIG. 12. The transmission circuit 1101 generates the high frequency signal of 24.125 GHz and on the basis of the ON/OFF signal having the repetitive period T [s] and the pulse width Tw [s] which is generated by the timing pulse generating circuit 1102, subjects the high frequency signal to the ON/OFF operation to radiate the high frequency signal in the form of the electric wave toward the outside of the pulse radar apparatus (refer to FIG. 12(*a*)). The electric wave thus radiated strikes an object to be reflected thereby to be inputted to the reception circuit 1103. At this time, since the leakage component is also directly inputted from the transmission circuit 1101 to the reception circuit 1103 at the same time, with respect to the received signal, as shown in FIG. 12(*b*), the detected waveform overlaps the leakage waveform. In this apparatus, this waveform is processed in the differentiating circuit 1104 in the next stage to be made the pulse waveform, which has a peak at the leading/trailing part as in FIG. 12(*c*). In addition, after the waveform on the negative side has been deleted in the waveform extracting circuit 1105, the signal having the resultant waveform is inputted to the limit amplifier circuit 1106 to be converted into the signal the amplitude of which is sufficient as the trigger signal (refer to FIG. 12(*d*)). Moreover, the count value of the counter circuit 1107 is incremented with the output of the limit amplifier circuit 1106 as the trigger (refer to FIG. 12(*e*)). Then, the sampling circuit 1108, on the basis of the sampling pulse generated by the timing pulse generating circuit 1102, samples the output of the counter circuit 1107. In the addition circuit 1109, the output of the sampling circuit 1108 is added and stored every sampling timing on the basis of the sampling pulse. Finally, the controller 1110 takes in the output of the addition circuit 1109 to execute the detection/distance measurement processing on the basis of the distance measurement completion signal outputted by the timing pulse generating circuit 1102.

Since the processing in the controller 1110 is the same as that in the controller of the third embodiment, the description thereof is omitted here for the sake of simplicity.

As described above, according to the pulse radar apparatus of the present embodiment, the output of the waveform leading part extracting unit 804 is sampled at predetermined time intervals, the count value of the counter circuit 1107 is updated on the basis of the sampling result, and the resultant value is added and stored every sampling timing only for the predetermined number of times in the addition means 806. Therefore, even in the case of the longer sampling time interval, the leading part of the waveform is prevented from being missed, and hence the sampling period can be increased.

While the present invention has been particularly shown and described with reference to the embodiments, it will be understood that the various changes and modifications will occur to those skilled in the art without departing from the scope and true spirit of the present invention. The scope of the invention is therefore to be determined solely by the appended claims.

What is claimed is:

1. A pulse radar apparatus, comprising:
   transmission means for transmitting an electromagnetic wave;
   reception means for receiving a reflected electromagnetic wave reflected by an object to output a received signal thereof;
   waveform leading part extracting means for extracting a plurality of leading parts of the received signal outputted by said reception means;
   sampling means for sampling the output of said waveform leading part extracting means at predetermined time intervals;
   addition means for adding and storing the output result of said sampling means every sampling timing; and
   detection/distance measuring means for, on the basis of the addition result for each of the sampling timings outputted by said addition means, judging whether or not an object is present, and when an object is present, calculating a distance to the object.

2. A pulse radar apparatus according to claim 1, wherein said waveform leading part extracting means includes differentiating means for differentiating a waveform.

3. A pulse radar apparatus according to claim 1, wherein said waveform leading part extracting means includes:
   delay means for delaying the output of said reception means by a predetermined time; and
   subtraction means for carrying out the subtraction between the output of said reception means and the output of said delay means.

4. A pulse radar apparatus according to claim 1, further comprising a differentiating means for detecting one or more leading edges of the received signal and one or more trailing edges of the received signal.

5. A pulse radar apparatus according to claim 4, wherein the leading part extraction means extracts the one or more leading edges of the received signal and does not extract the one or more trailing edges of the received signal.

6. A pulse radar apparatus according to claim 1, further comprising counter means which operates on the basis of the extraction result of said waveform leading part extracting means,
   wherein said sampling means samples the output of said counter means at predetermined time intervals.

7. A pulse radar apparatus, comprising:

a transmission circuit operable to transmit an electromagnetic wave;

a reception circuit operable to receive a reflected electromagnetic wave reflected by an object to output a received signal thereof;

a waveform leading part extraction circuit operable to extract a plurality of leading parts of the received signal outputted by said reception circuit;

a sampling circuit operable to sample the output of said waveform leading part extracting circuit at predetermined time intervals;

an addition circuit operable to add and store the output result of said sampling circuit every sampling timing; and a detection/distance measuring circuit operable to, on the basis of the addition result for each of the sampling timings outputted by said addition circuit, judge whether or not an object is present, and when an object is present, calculate a distance up to the object.

8. A pulse radar apparatus according to claim 7, wherein said waveform leading part extracting circuit comprises a differentiating circuit operable to differentiate a waveform.

9. A pulse radar apparatus according to claim 7, wherein said waveform leading part extracting circuit comprises:

a delay circuit operable to delay the output of said reception circuit by a predetermined time; and a subtraction circuit operable to carry out the subtraction between the output of said reception circuit and the output of said delay circuit.

10. A pulse radar apparatus according to claim 7, further comprising a counter circuit which operates on the basis of the extraction result of said waveform leading part extracting circuit, wherein said sampling circuit samples the output of said counter circuit at predetermined time intervals.

11. A pulse radar apparatus according to claim 7, further comprising a differentiating circuit which detects one or more leading edges of the received signal and one or more trailing edges of the received signal.

12. A pulse radar apparatus according to claim 11, wherein the leading part extraction circuit extracts the one or more leading edges of the received signal and does not extract the one or more trailing edges of the received signal.

* * * * *